3,257,233
TEXTILE FABRIC TREATED WITH DITERTIARY AMINE OBTAINED FROM A SECONDARY AMINE AND POLYOXYETHYLENE GLYCOL AND THE QUATERNARY OBTAINED THEREFROM
Robert Nordgren and Donald H. Wheeler, Minneapolis, Minn., assignors to General Mills, Inc., a corporation of Delaware
No Drawing. Filed Apr. 8, 1963, Ser. No. 271,507
3 Claims. (Cl. 117—139.5)

The present invention relates to novel ditertiary amines prepared from secondary amines and polyoxyalkylene glycols and to the quaternary ammonium compounds prepared from such ditertiary amines. The ditertiary amines of the present invention have the following formula:

$$R_2N(R'O)_nR'NR_2$$

where R is an aliphatic hydrocarbon group containing from 8–22 carbon atoms, R' is an alkylene group containing from 2–3 carbon atoms and $n$ is an integer of from 1 to about 200, preferably from 4–200.

The quaternary ammonium compounds of the present invention have the following formula:

$$\left[ R_2\overset{+}{N}(R'O)_n R'\overset{+}{N}R_2 \underset{R''}{\overset{R''}{|}} \underset{}{\overset{}{|}} \right] 2X^-$$

where R and R' are as above described and R'' is an aliphatic hydrocarbon group containing from 1 to 4 carbon atoms and X is an anion. These compounds are novel surface active materials and find use as textile softeners and as antistatic agents for molded resins and synthetic fibers.

It is therefore an object of the present invention to provide novel compounds having the above formula.

The preparation of the products of the present invention is illustrated by the following formulas:

$$2R_2NH + HO(R'O)_nR'OH \longrightarrow R_2N(R'O)_nR'NR_2 + H_2O$$

$$\downarrow R''X$$

$$\left[ R_2\overset{+}{N}(R'O)_n R'\overset{+}{N}R_2 \underset{}{\overset{R''}{|}} \underset{}{\overset{R''}{|}} \right] 2X^-$$

The secondary amines used as starting materials in the above reaction are readily available commercially. They are usually derived from the higher fatty acids containing from 8 to 22 carbon atoms, via the nitrile and then through reduction of the nitriles to the secondary amine. These amines may be saturated or unsaturated depending on the starting materials from which they are derived.

Typical secondary amines which may be used in the present invention include the capryl, lauryl, palmityl, stearyl, oleyl amines which contain two identical fatty groups as well as those which contain two distinctly different fatty groups. In addition to this possibility, the random mixture of secondary amines which one would obtain by using a mixed fatty acid of a fat or oil as a starting material, or any selected fraction thereof.

The polyalkylene glycols are likewise readily available commercial materials. Those derived from ethylene oxide and propylene oxide are of particular interest. The polyethylene glycols are available in a variety of chain lengths, and generally have a molecular weight in the range of 200 to 6000. The polyethylene glycol having a molecular weight of 200 has molecules with from 1 to 10 of the ethylene groups with an average of about 4 in the molecules. The polyethylene glycol having a molecular weight of 600 contains molecules having from 2 to 25 oxyethylene groups with an average of about 14. A polyethylene glycol having a molecular weight of 6000 has molecules which contain from 100 to 170 oxyethylene groups with an average of about 135. The lower molecular weight polyethyl glycols having molecular weights within the range of 200 to 600 and higher are liquid whereas those having a molecular weight of 1000 and higher are generally waxy solids.

The alkyl halides employed for quaternization of the tertiary amines may be simple alkyl halides such as methyl, ethyl, propyl and butyl chlorides or other halides. In place of the halide anion it is possible to have a variety of other anions on the quaternary compound. Such suitable anions include the sulphates, hydrosulphates, acetates, carbonates, phosphates, oxalates and the like. It is to be understood that the illustration of the anion in the foregoing reactions contemplates monovalent anions as well as polyvalent anions.

The following examples will serve to illustrate the invention but are not to be construed as limiting thereof. In the examples, the indicated primary and secondary amines in the final products are residual starting material, the starting material containing a small trace of primary amine. The tertiary amines and the quaternary ammonium compound are the products of the present invention and have formulas given for them in this application.

Example I

Into a stirred autoclave was charged 509 grams of a secondary amine prepared from hydrogenated tallow fatty acids, 125 grams of a polyethylene glycol of a molecular weight of approximately 200, and 32 grams (5% by weight) of a copper-chromite hydrogenation catalyst. The system was brought to 220° C. under a hydrogen pressure of 65–85 p.s.i. over a period of 2¾ hours with continuous venting. At this point the reaction mixture was cooled, vented, and filtered to remove catalyst. A sample was taken, and analytical data indicated that conversion to tertiary amine was incomplete. Therefore, 436 grams of the above filtered reaction mixture was recharged to a stirred autoclave, together with 25 grams of the catalyst, and an additional 25 grams of the polyethylene glycol. The system was again brought to 220° C. under 400 p.s.i. hydrogen pressure and continuous vent. After 3½ hours reaction the mixture was again cooled, vented, and filtered to remove catalyst. The product was analyzed, giving the following analytical data:

Total amine # _____ 89.5
II° and III° amine # _____ 88.3
III° amine # _____ 74.7

Based on the above analytical results the product had the following composition:

| | Percent |
|---|---|
| Primary amine | 0.4 |
| Secondary amine | 12.7 |
| Tertiary amine | 81.2 |

Example II

To a Parr stirred autoclave was charged 203 grams (.33 mole) of the reaction product of Example I, 235 grams isopropanol, 28 grams (.33 mole) of NaHCO$_3$. A cylinder containing methyl chloride was attached to the system and methyl chloride added as needed. Over a period of 3½ hours the reaction mixture was maintained at a temperature of 100–116° C., and at a pressure of 80–120 p.s.i. (MeCl), during which time 75 grams of methyl chloride was consumed. The mixture was cooled, vented, and filtered to remove inorganic salts. The resulting product was a clear liquid having the following analyses:

| | Percent |
|---|---|
| Free amine | 0.87 |
| Amine hydrochloride | 0 |
| Solids | 49.3 |
| Cl$^-$ | 2.52 |
| Quaternary | 46.7 |

*Example III*

To a stirred autoclave was charged 458 grams (0.9 equivalent) of di(hydrogenated) tallow amine, 162 grams (0.9 equivalent plus 20% excess) of a polyethylene glycol of a molecular weight of approximately 300 and 42 grams (7%) of a copper-chromite hydrogenation catalyst. The reaction system was heated to 220° C. under a hydrogen pressure of 400 p.s.i. with continuous venting and the reaction carried out for 5 hours at which time the product had a tertiary amine number of 47. The reaction was continued for an additional 7 hours at which time the tertiary amine number was 68. The reaction was continued for another 6 hours at which time the reaction mixture was cooled, vented, and filtered and the light colored liquid product analyzed:

| | |
|---|---|
| Total amine # | 87.5 |
| II° and III° amine # | 86.8 |
| III° amine # | 80.0 |
| Hydroxyl # | 31.7 |

Based on the above analyses the product had the following composition:

| | Percent |
|---|---|
| Primary amine | 0.3 |
| Secondary amine | 6.2 |
| Tertiary amine | 94.2 |
| Unreacted polyethylene glycol | 6.4 |

*Example IV*

To a Parr autoclave was charged 220 grams (.33 mole) of the reaction mixture of Example III, 236 grams isopropanol, 28 grams (.33 mole) sodium bicarbonate, and 1 gram potassium hydroxide. The autoclave was sealed, put under a slight water pump vacuum and methyl chloride added from a cylinder and the system heated and stirred for a period of approximately 3¾ hours during which time the temperature varied from 96 to 111° C. and under a pressure of 30 to 115 pounds methyl chloride pressure. The yield was 405 grams of a product analyzing:

| | Percent |
|---|---|
| Free amine | 1.4 |
| Solids | 58.4 |
| Amine hydrochloride | 0 |
| Chloride | 2.91 |
| Quaternary | 58.3 |

*Example V*

To a Parr autoclave was charged 409 grams (0.8 equivalent) of di-(hydrogenated) tallow amine, 150 grams (0.8 equivalent plus 25% excess) of a polyethylene glycol of molecular weight of approximately 300 and 33 grams of a copper-chromite hydrogenation catalyst. The reaction was continued for 19¾ hours with the reaction temperature maintained between 192 and 215° C. at a hydrogen pressure of 280 p.s.i. with continuous venting, at which time the reaction mixture was cooled, vented, and filtered to yield a product having the following analysis:

| | |
|---|---|
| Total amine # | 85.6 |
| II° and III° amine # | 85.1 |
| III° amine # | 79.4 |

Based on the above analytical data, the product had the following composition:

| | Percent |
|---|---|
| Primary amine | 0.2 |
| Secondary amine | 4.6 |
| Tertiary amine | 94.2 |

*Example VI*

To a Parr autoclave was charged 361 grams of the reaction product of Example V, 224 grams isopropanol, 30 grams sodium bicarbonate, and 1 gram potassium hydroxide. The autoclave was sealed, methyl chloride was added, and the reaction carried out for a total of 4 hours at a range of 98 to 104° C. and at a methyl chloride pressure of 80–100 p.s.i. The reaction mixture was cooled, vented, and filtered. The product is a light tan clear liquid analyzing:

| | Percent |
|---|---|
| Free amine | 1.2 |
| Amine hydrochloride | 0 |
| Solids | 68.4 |
| Chloride | 3.33 |
| Quaternary | 66.6 |

The quaternaries, as described in Examples II, IV and VI are useful antistatic agents for polypropylene film. These products were checked by means of spray application followed by friction and static pick-up tests.

Certain of the quaternaries of the present invention are particularly effective as agents for softening cotton fabrics. Laboratory data show these materials to be equal to the best of the commercially available softeners.

*Example VII*

The quaternary ammonium compound, as prepared in Example II, was tested for efficiency as a fabric softener as follows:

Swatches of Birdseye cotton totaling a normal 8 lb. load were washed in a household type automatic washer using one cup of commercial heavy duty household detergent. The swatches measured 36" x 12". After the wash cycle and the spray rinse, the cloth swatches were removed for treatment with the test fabric softener.

A 0.00707% solution of the quaternary ammonium compound of Example II was prepared in distilled water by dilution from a 0.1% active stock solution. Into this 0.00707% solution, maintained at 100° F. in a temperature controlled bath, a single swatch was dipped and agitated for a period of 4 minutes, then allowed to stand for 1 minute, and the supernatent solution poured off. The level of treatment was 17.7:1 solution: cloth ratio, corresponding to 0.00125 gram of active softener compound per gram of fabric, or approximately 673 grams of 0.00707% solution for a cloth swatch weighing approximately 38 grams.

After dipping, the swatches were spun damp dry in the washer and hung to air dry. After drying, the swatches were cut into 4" x 4" pieces for softness testing. The test samples were equilibrated at 50% relative humidity before testing.

Softness was evaluated by a regular panel of 12 members. Testing was done in duplicate.

The swatches treated as above exhibited statistically significant softness at this exhaustion concentration of 0.00707%.

*Example VIII*

Using the test method of Example VII, the quaternary ammonium compound of Example IV was tested for softening efficiency when exhausted on cotton Birdseye fabric. The results of the panel test showed statistically significant softening at an exhaustion concentration of 0.00707%.

These compounds are useful for the softening of textile fabrics in general, including such natural fibers as cotton, linen and wool, and synthetic fibers such as rayon, cellulose acetate, nylon, polyester, acrylonitrile and other fibers. In general, these softening compounds are used on such fabrics in the range of from about 0.001 to 0.02% by weight based on the weight of the fabric. Concentrations both above and below this range may be used but, in general, are not preferred.

While specific secondary amines, glycols and alkylating agents have been used in the examples, others within the scope of the invention may be substituted therefor to produce closely related products. Thus, longer and shorter chain secondary amines, both saturated and unsaturated, may be used as well as higher molecular weight polyethylene glycols and polypropylene glycols may be used to produce products having these same general chemical characteristics but varying somewhat in their physical properties depending upon the constituents from which they have been derived. Similar variation is possible in the alkylating agents without materially changing the nature of the compounds produced.

The embodiments of the invention in which an exclusive property or privilege is claimed are defined as follows:

1. A textile fabric having deposited on the surface of the fibers thereof a softening amount of a compound selected from the group consisting of diamines of the formula:

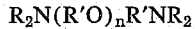

and quaternary ammonium compounds of the formula:

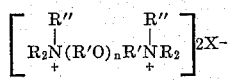

in which R is an aliphatic hydrocarbon group containing from 8 to 22 carbon atoms, R' is an alkylene group containing from 2 to 3 carbon atoms, R'' is an aliphatic hydrocarbon group containing from 1 to 4 carbon atoms, X$^-$ is an anion and $n$ is an integer of from 1 to about 200.

2. A textile fabric as defined in claim 1 wherein the compound is a quaternary ammonium compound of the formula

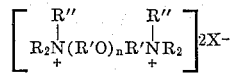

3. A textile fabric as defined in claim 1 wherein the compound is employed in an amount of from 0.001 to 0.02% by weight.

References Cited by the Examiner

UNITED STATES PATENTS

| | | | |
|---|---|---|---|
| 1,970,578 | 8/1934 | Schoeller | 260—584 X |
| 2,402,767 | 6/1946 | Morey | 252—8.8 |
| 2,498,195 | 2/1950 | Ballard et al. | 260—584 |
| 2,596,985 | 5/1952 | Cook | 117—139.5 |
| 2,683,147 | 7/1954 | Girod | 260—584 XR |
| 2,690,426 | 9/1954 | Jefferson et al. | 252—8.8 |
| 2,716,134 | 8/1955 | Reynolds et al. | 260—570.5 |
| 2,759,020 | 8/1956 | Girod | 260—567.6 |
| 2,766,288 | 10/1956 | Erickson | 260—584 |
| 2,790,003 | 4/1957 | Bindler | 260—584 |
| 2,857,330 | 10/1958 | Hall | 252—8.8 |
| 2,940,816 | 6/1960 | Sniegowski | 260—567.6 X |
| 2,941,967 | 6/1960 | Moller et al. | 260—584 X |
| 2,944,902 | 7/1960 | Carroll et al. | 260—567.6 X |
| 2,970,158 | 1/1961 | Levis | 260—404.5 |
| 2,993,919 | 7/1961 | Findley et al. | 260—404.5 |
| 3,038,820 | 6/1962 | Albrecht | 117—141 X |

WILLIAM D. MARTIN, *Primary Examiner.*

WALTER A. MODANCE, *Examiner.*

F. D. HIGEL, T. G. DAVIS, *Assistant Examiners.*